W. MITCHELL.
STEAM GENERATOR.
APPLICATION FILED NOV. 8, 1910.

1,141,071.

Patented May 25, 1915.
3 SHEETS—SHEET 2.

WITNESSES
R. E. Babcock
H. F. Rueth

INVENTOR
Willis Mitchell
by
W. H. Babcock
Attorney

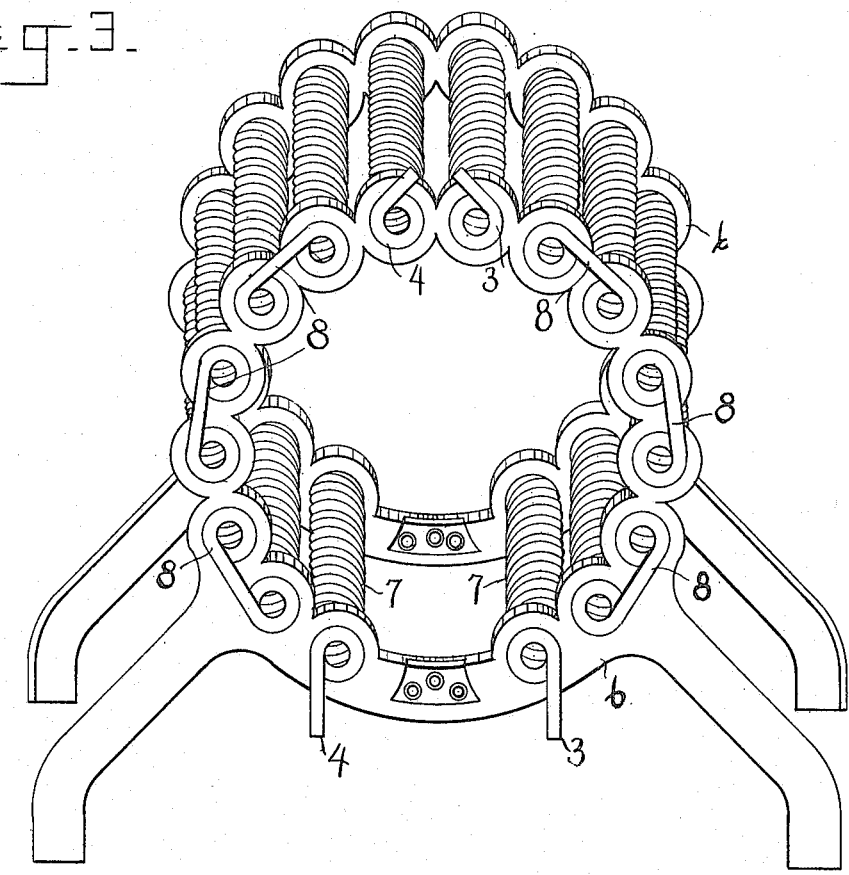

UNITED STATES PATENT OFFICE.

WILLIS MITCHELL, OF MALDEN, MASSACHUSETTS, ASSIGNOR TO WILLIS MITCHELL COMPANY, INC., OF NEW YORK, N. Y., A CORPORATION OF NEW YORK.

STEAM-GENERATOR.

1,141,071.     Specification of Letters Patent.     Patented May 25, 1915.

Application filed November 8, 1910. Serial No. 591,300.

*To all whom it may concern:*

Be it known that I, WILLIS MITCHELL, a citizen of the United States, residing at Malden, in the county of Middlesex and State of Massachusetts, have invented certain new and useful Improvements in Steam-Generators; and I do hereby declare the following to be a full, clear, and exact description of the invention, such as will enable others skilled in the art to which it appertains to make and use the same.

This invention relates to an improvement on my Patent #848,564, in which a water tube wound into helices surrounds a burner within a nearly closed casing. The present invention retains all the advantages of this form of steam generator and also provides for a more perfect control of the steam pressure and temperature by means of the construction hereinafter more particularly set forth and claimed. The burner employed closely resembles the burner used in Patent #848,597 a division of the above patent but is improved and has a part added thereto.

This generator is adapted for use in heating buildings and like purposes as well as for supplying motive power.

Figure 1:
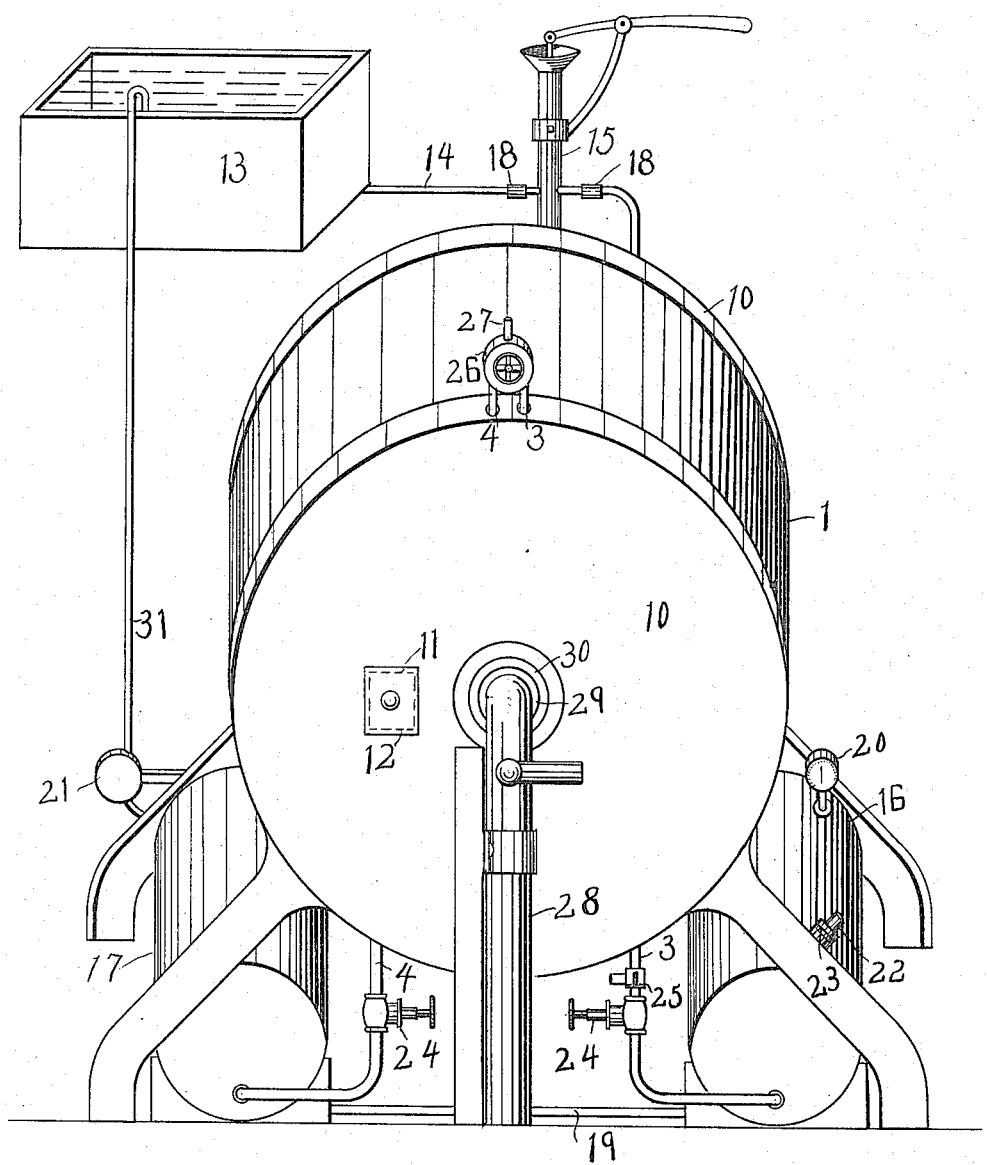
Figure 2:
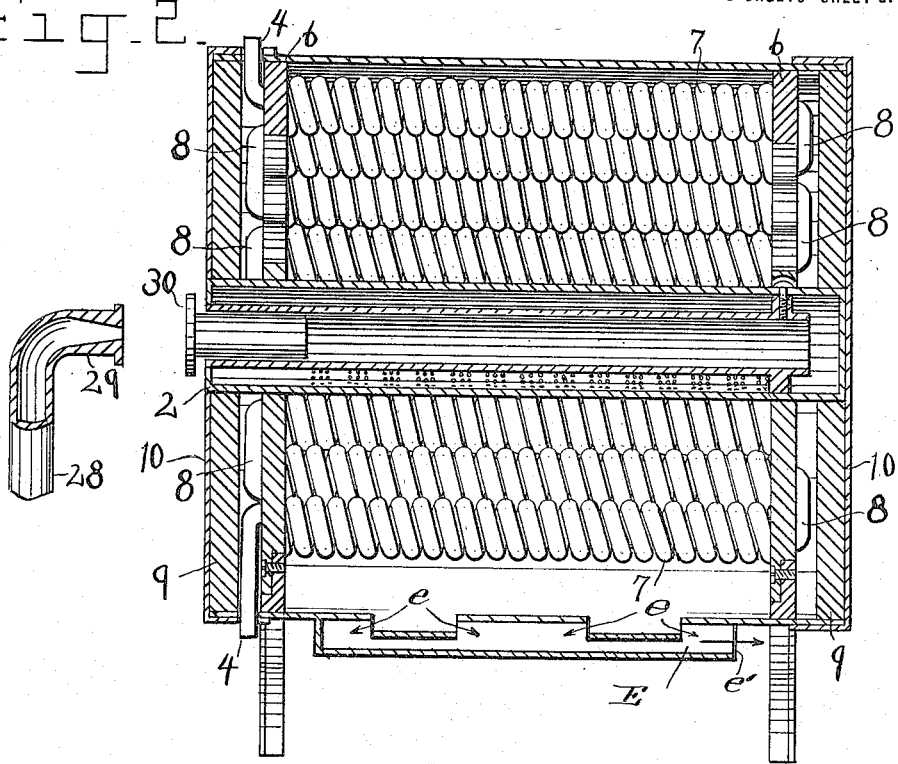
Figure 4:
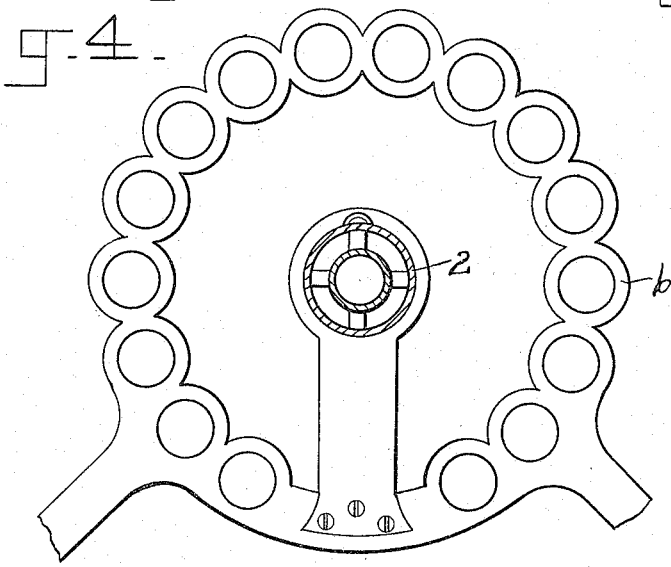

In the accompanying drawings: Figure 1 represents a perspective view of an improved steam generator embodying my invention and its connections; Fig. 2 represents a vertical longitudinal central sectional view through the generator casing and its contents and the nozzle of the gas pipe; Fig. 3 represents a perspective view of the contents of the casing; Fig. 4 represents a detail side elevation of one of the supports for the helices, provided with the corresponding supporting legs for the burner and mixing chamber.

1 designates the cylindrical casing inclosing the superheater tubes, burner, tube supports, &c., said casing forming the outside of the heater and being recessed in its front and rear edges to receive the legs of the supporters 6. Said casing is also perforated near its front edge at top and bottom, to permit the passage of the tubes 3 and 4 respectively. The supporters 6 above referred to are constructed of any suitable material in a ring form but have a scalloped circumference and are provided with circular holes through which said tubes 3 and 4 are wound in the form of helices 7. Said supporters are inserted in said casing, one near each end, and by reason of their scalloped circumference they will come into contact with said casing only at intervals, thus transmitting heat to said casing only at such points of contact. Said helices 7 above referred to are composed of said tubes 3 and 4 respectively coiled in alternately opposite directions, so that each successive coil will not quite touch the one next it and so that each helix will not come into contact with the helices next it, said helices having communication through the loop 8 at each end of each coil, except at the two bottom and two top helices. These two top helices are adapted to have communication with each other or to discharge their steam out of the heater as desired and as will hereinafter be explained. 9 designates two disks of insulating material placed inside said casing at each end respectively thereof between the interior of the casing and the exterior of the burner. 10 designates the two end caps fitting over the front and back ends of said casing, the front end being provided with a circular hole into which the forward end of said burner fits snugly making an air tight closure. Said front end cap is further provided with an opening 11 through which the gas may be ignited, this opening extending all the way through the adjacent insulator piece 9. 12 designates a slide or sliding door which normally closes said opening, but must be opened at the time of ignition and of course may be opened whenever convenient. The outlet of said casing is through openings *e* at its bottom into a flue E discharging at *e'* as shown in Fig. 2.

13 designates an ordinary supply tank, supplying water through a pipe 14 and a pump 15 to the pressure tanks 16 and 17 respectively, the water being prevented from returning through said pipe by means of check valves 18 situated in said pipes.

31 designates a return pipe from the pressure tank 17 to the tank 13, said pipe being provided with a safety valve 21 between said tanks for allowing the water to return to tank 13 after a certain predetermined pressure has been attained in tanks 16 and 17, thus preventing too great a pressure, yet maintaining the desired amount of pressure as shown by a gage 20 mounted on pressure tank 16 near its rear end. 22 designates a nipple mounted on said tank 16 and having communication with the interior thereof, said nipple being provided with a turn cock or other suitable valve 23 for cutting off such communication while the heater is in use or when desired.

The lower ends of the tubes 3 and 4 are connected to the lowest points of the front ends of the pressure tanks 16 and 17 respectively and are provided with turn cocks 24 for opening and closing direct communication between said tanks and tubes. Tube 3 is further provided with a nipple and turn cock 25 just a little above its turn cock 24, the object of which will hereinafter more clearly appear.

26 designates a three-way valve and casing into which the upper ends of tubes 3 and 4 are carried, said casing being provided with an outlet 27. This valve when turned in one position, the turn cock 24 of tube 3 being closed and turn cock 24 of tube 4 and turn cock 25 being open, makes communication between the two series of tubing 3 and 4 and the water will pass from pressure tank 17 up through tube 4, through the valve and casing 26, down through tube 3 and out of the nipple of turn-cock 25 into the steam heater or engine feeder. In such case the device is at high pressure for the two tanks being connected by equalizing pipe 19, their combined pressure is exerted to force the water through the whole series of coils or helices. The water escapes from these coils in the form of superheated steam. This feature is particularly desirable in case it is to be used to generate steam for engines.

If it be desired to reduce the device to low pressure, as would be more appropriate in case of heating buildings, the radiator pipe is connected to the outlet 27 of the three-way valve and casing 26, the turn cock is then turned to close its nipple and the valve 26 is turned to disconnect said tubes 3 and 4. The turn cock 24 of the tube 3 is then turned to form direct communication between the helices 7 of the tube 3 and tank 16, the water flowing directly from the tanks 16 and 17 into the tubes 3 and 4 respectively, through their helices 7, out of their upper ends into the three-way valve and casing 26 and out through its outlet 27 into the radiator pipe. In the latter case the pressure tanks may be done away with and the water introduced directly from the hydrant into the tubes, also if it be desired to heat the building by hot water the helices may be so reduced as to accomplish this result.

2 designates the burner above referred to as resembling that in my Patent No. 848,597. The same consists of an exterior cylindrical casing or burner body and a cylindrical mixing chamber 30 held by a screw and radial lugs 32 concentrically within the same. These lugs and screws are at the inner end of said mixing tube which end is open to permit the discharge of a mixture of air and vaporized hydrocarbon therefrom into the interior of the said casing or burner body near the closed rear end of the latter. It escapes through a great number of holes 35 in the cylindrical wall of this casing where it is ignited. The outer end of said mixing chamber is cast with or otherwise attached rigidly to the corresponding end of said burner body, leaving no space for the passage of air or vapor between them. In said outer end of said mixing chamber a tubular sliding piece 30 is telescoped being in effect an adjustable extension of the said mixing chamber. The outer end of this sliding piece extension or tubular slide 30 is enlarged to prevent it from passing entirely into said chamber. It may however be drawn out to a greater or less extent correspondingly varying the interval between it and the said oppositely arranged nozzle 29 and thus increasing or decreasing the space through which the air will be supplied to said tube with the hydrocarbon. This of course regulates the proportion of air and inflammable vapor supplied to said burner.

28 designates the gas feeding tube having an injector nozzle 29 which has a squared face presented toward, and large enough to close the end of, tubular slide 30. When the gas valve of said feed pipe 28 is open full this slide or governor should be pushed as far as possible into the end of the mixing tube in order that a sufficient amount of air may be mixed with the gas, thus taking along with it into the mixing tube a sufficient amount of oxygen to insure a clean combustion. This space in the medium and usual size of heater is about four inches. This combustion is helped in all positions of adjustment of the slide by the arrangement of the holes or outlets in the burner proper. These outlets are arranged so that there is a group of three rings of outlets and a space, then three more rings of outlets and so on. The air collects in the spaces between the groups of outlets and so adds to the oxygen coming in.

In case the gas valve be partially closed the slide or governor should be proportionately pulled out of the mixing tube. For if it be left in its former position there would be too much air and a poor combustion and bad odor would be the result. On the other hand if it be pulled too far out there will be too much gas and not enough air, as a result there will be poor combustion, the burner will get red-hot and fire back. If however it be adjusted proportionate to the adjustment of the valve there will be no trouble, but it will burn steadily giving an intense heat or a lower heat as desired, in a closed casing. If the governor be adjusted close up to the nozzle it will cut off partially the air supply to said governor, thus preventing a disproportionate amount of air entering said governor and mixing tube.

The device or generator may be placed in a basement and connected with the radiator pipe and a supply of water and if covered with some insulating material such as asbestos it will not heat the basement beyond a moderately reasonable and comfortable degree. If the insulation be made sufficiently thick it will not heat the basement at all.

The operation is as follows: The turn-cocks 24 are turned to close communication between the tanks 16 and 17 and the helices 7. The turn cock 23 of the nipple 22 is then turned to open said nipple. Next an air pump is connected to said nipple and air is pumped into said tanks until the pressure gage registers, preferably, about one hundred pounds. Next water is pumped in at the rear, the turn cock 23 being turned to close the nipple 22, until the desired pressure, preferably about three hundred pounds, is obtained by means of the pump 15. The safety valve 21 should be adjusted at this pressure, if this be the pressure desired, and when the pressure slightly exceeds three hundred pounds this valve will open and permit the water to flow back or be forced by the pressure through return pipe 19 to the tank 13, thus preventing the predetermined pressure being exceeded to any extent. After this the desired communication with the helices is made as above explained. When the water is heated and transformed into steam it creates a pressure which forces back enough steam and air into the pressure tanks to keep the pressure even, so that when three fourths of the water has been used the pressure will still be three hundred pounds, the same as it was at the time of making the desired communication with the helices 7.

Having thus described my invention, what I claim as new and desire to secure by Letters Patent is:

1. In combination with a casing and a burner within the same, water-tube helices arranged with their axes parallel and in proximity to each other and consisting of a continuous tube wound from end to end of the casing in alternately opposite directions.

2. In combination with a casing and a burner within the same, water-tube helices arranged in a circular series surrounding said burner within said casing and means for regulating the flow of water at will either continuously through all the series or through parts of the series.

3. In combination with a casing and a burner arranged therein, water tube helices arranged in two corresponding semi-circular series, means for connecting them together to allow the passage of water and means for supplying water to one of said semi-circular series or to both of said series simultaneously.

4. A casing, two semi-circular series of water-tube helices within the same, a burner arranged within the circle formed by the said two series taken together, a three-way cock for connecting the two series in one or giving each a separate discharge at will and reservoirs and pipes coöperating with said cock for supplying said two semi-circular series independently with water or supplying them as one connected series.

5. A pair of water tanks, in combination with a pipe connecting them, a steam generator, a pair of steam generator pipes connecting each tank respectively to the generator and cut-off valves in said pipes, each of said pipes being provided with one of said valves, whereby the said tanks may be made to supply the generator independently, or both together may supply it at one point substantially as set forth.

6. A steam-generator consisting of divisible series of water tube sections and means for connecting the same together continuously or separating them at will, in combination with water tanks and pipes and valves controlling their connection to said water generator tube, each of said pipes being connected to one of said tanks for supplying said generator and being provided with a cut-off valve, said tanks being also connected to each other substantially as set forth.

7. A steam generator consisting of divisible series of water tube sections and means for connecting the same together continuously or separating them at will, in combination with water tanks, supply pipes communicating with the inlet end of said water tube, valves located in said pipes controlling the supply of water, a return pipe connected to the outlet end of said water tube and a safety valve located in said return pipe opening when a certain predetermined pressure is slightly exceeded and thus permitting the return of the water through said return pipe.

In testimony whereof, I have signed my name to this specification in the presence of two subscribing witnesses.

WILLIS MITCHELL.

Witnesses:
CHARLES W. HOWARD, Jr.,
LENA E. MANSFIELD.